June 7, 1927.
A. E. COOK
1,631,248
AUTO MARINE VEHICLE AND TRAILER
Filed Aug. 17, 1925
4 Sheets-Sheet 1
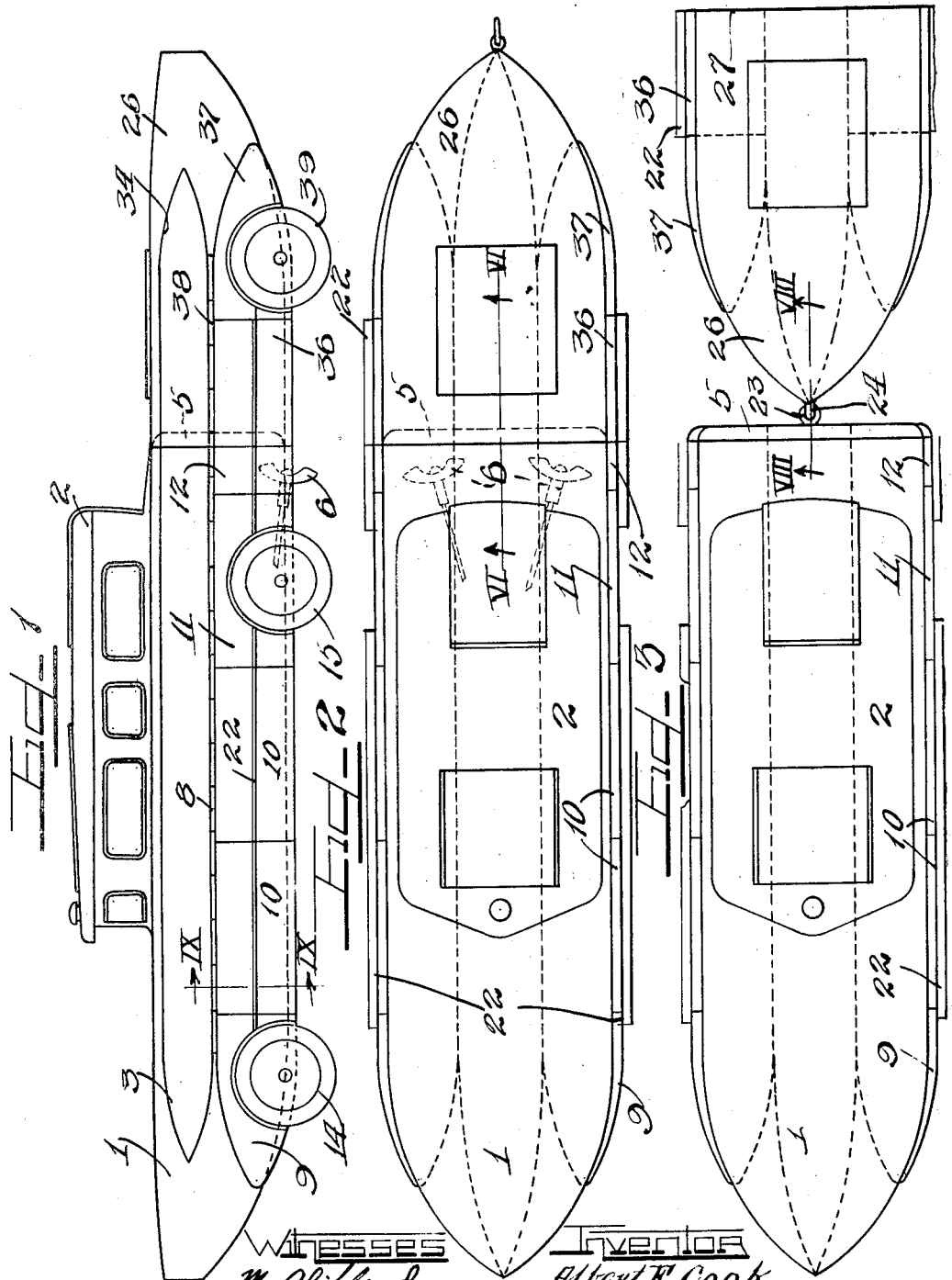

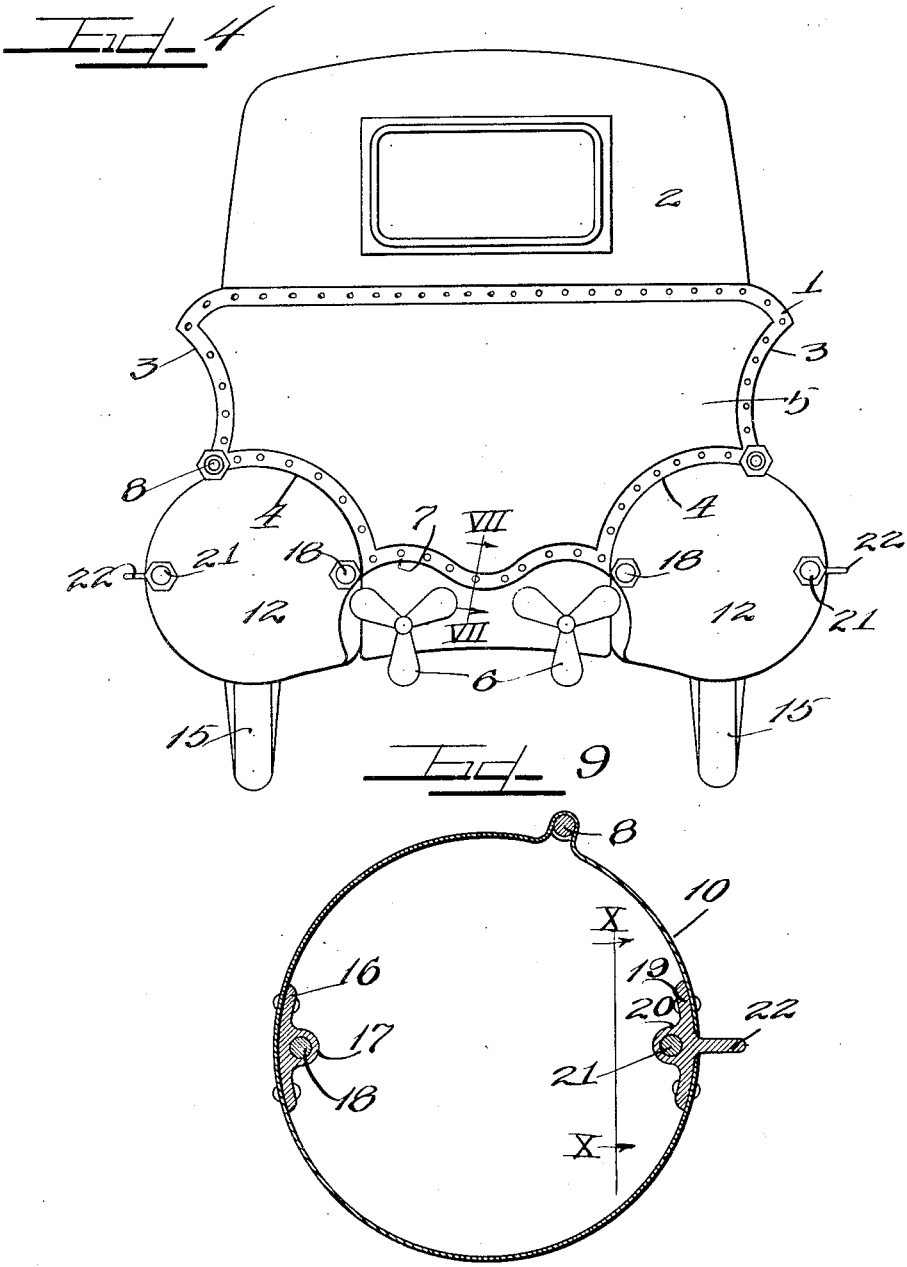

June 7, 1927.
A. E. COOK
1,631,248
AUTO MARINE VEHICLE AND TRAILER
Filed Aug. 17, 1925    4 Sheets-Sheet 3
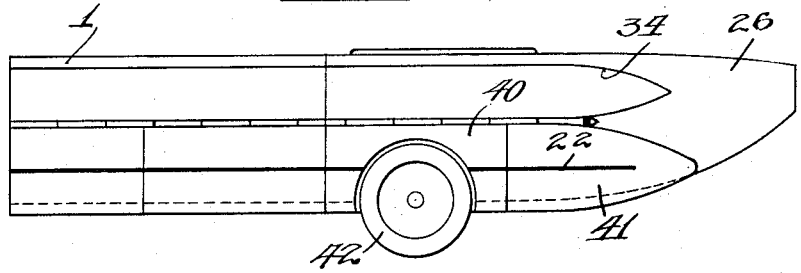
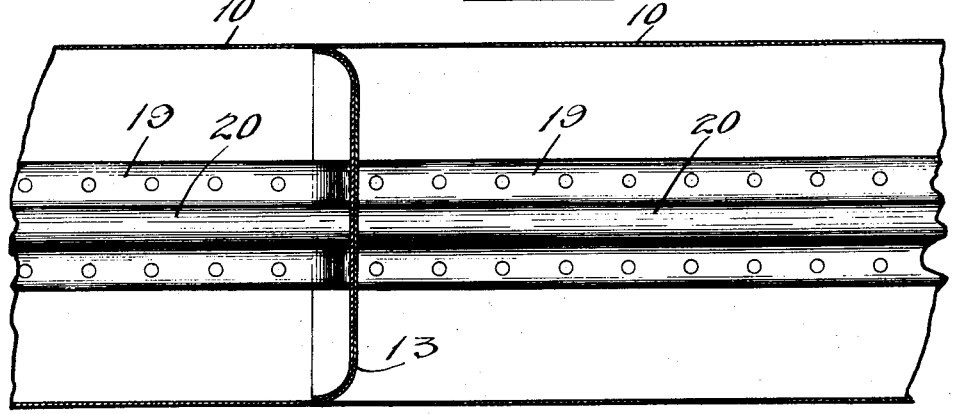
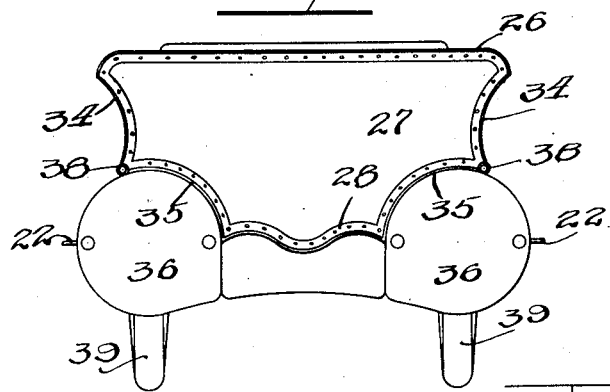

June 7, 1927.
A. E. COOK
1,631,248
AUTO MARINE VEHICLE AND TRAILER
Filed Aug. 17, 1925     4 Sheets-Sheet 4
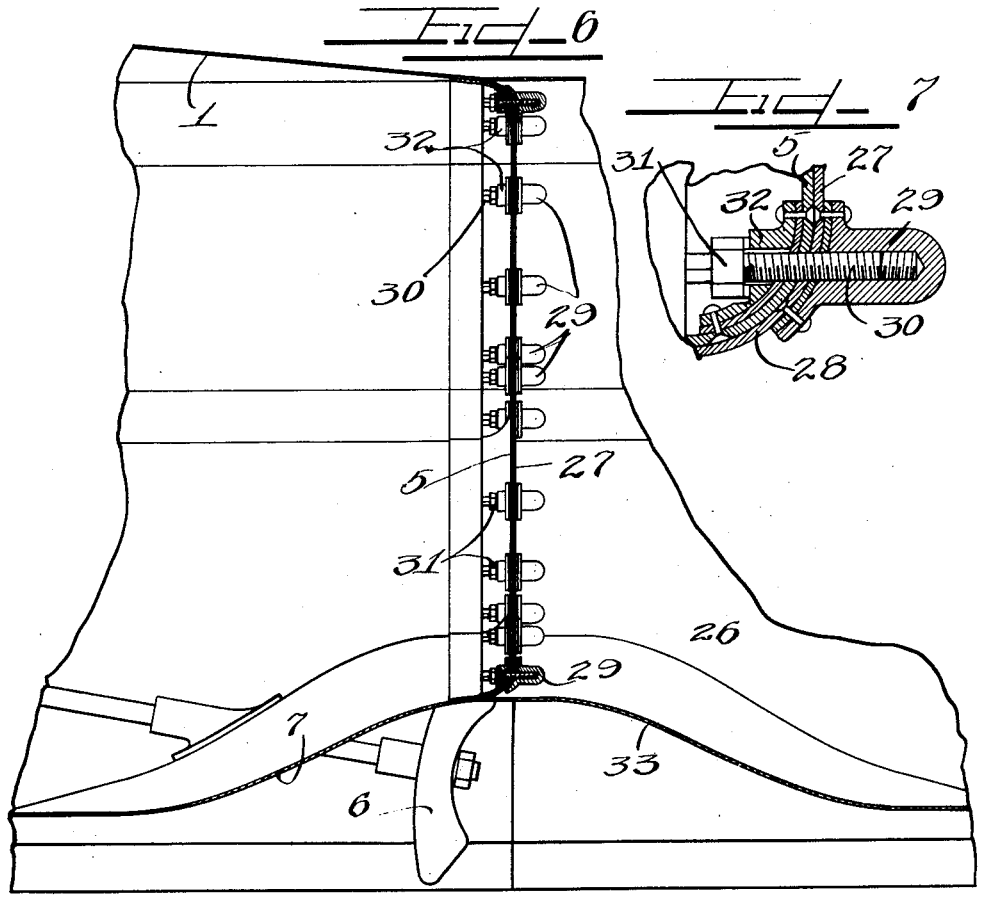
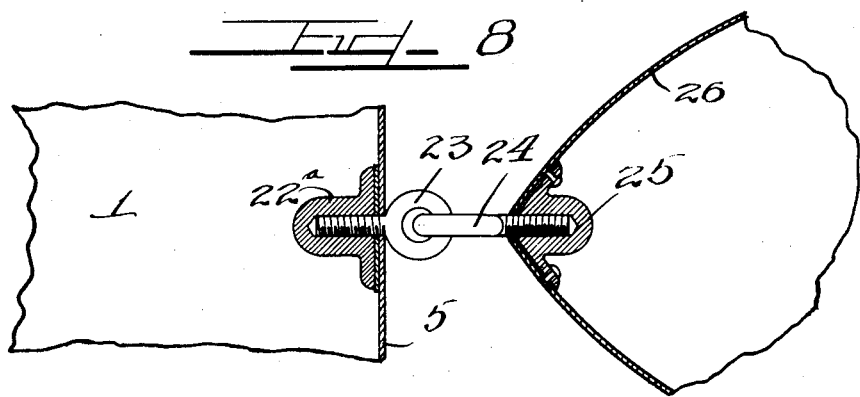

Patented June 7, 1927.

1,631,248

UNITED STATES PATENT OFFICE.

ALBERT E. COOK, OF EVANSTON, ILLINOIS, ASSIGNOR TO CHARLES B. COOK, OF CHICAGO, ILLINOIS.

AUTO MARINE VEHICLE AND TRAILER.

Application filed August 17, 1925. Serial No. 50,734.

This invention relates to an improved auto marine vehicle and trailer wherein the main body of the vehicle is provided with wheels and with propellers to permit the vehicle to be used on land or in water. The improved vehicle is also provided with a trailer which is adapted to be removably connected with the main body of the vehicle when on land and serve merely as a trailer while when the vehicle is used as a water craft the trailer may be rigidly secured to the rear end of the main body of the vehicle to materially increase the length of the vehicle to afford a water craft of greater length and stability.
It is an object of this invention to provide a land and water vehicle comprising a main body section and an extension, both of which are provided with interfitting pontoon sections and with a trailer so arranged that the same may be readily and rigidly secured to the rear end of the main body portion of the vehicle to increase the length thereof when the vehicle is used as a water craft.

It is also an object of this invention to provide an improved auto marine vehicle wherein a trailer is adapted to be rigidly secured to the rear end of the main body of the vehicle, said securing means being readily accessible from the interior of the main body portion of the vehicle.

It is a further object of this invention to provide an auto marine vehicle and trailer wherein both the vehicle and the trailer may be rigidly secured together to produce an elongated water craft with both the main body of the vehicle and the trailer having sectional pontoons hingedly secured thereon and adapted to be raised when in the water to change the draft of the vehicle.
It is furthermore an object of this invention to provide a land and water vehicle and trailer wherein the vehicle and trailer are both provided with supporting wheels for use on land and furthermore wherein the trailer may be rigidly secured to the end of the vehicle to provide an elongated water craft adapted to be driven in the water by means of a plurality of propeller mechanisms driven from the driving unit of the vehicle.

Another object of this invention is the construction of a land and water vehicle and trailer wherein the trailer may be rigidly secured to the end of the main body of the vehicle by means of bolt mechanisms accessible from the interior of the main body of the vehicle.

Still another object of the invention is to provide an improved auto marine vehicle and trailer wherein the main body of the vehicle and the trailer are provided with sectional pontoons adapted to extend longitudinally of the sides of the vehicle and support wheels which are adapted to track on the ground when the vehicle is used on land and which are adapted to be swung upwardly with the pontoons when the vehicle is used as a water craft.

It is an important object of this invention to provide an improved auto marine vehicle and trailer wherein the main body of the vehicle and the trailer body are adapted to be removably secured together by improved retaining means and wherein the trailer may be used to increase the length of the vehicle when used in the water.

Other and further important objects of this invention will be apparent from the disclosures in the specification and the accompanying drawings.

This invention is illustrated in the drawings and hereinafter more fully described.

On the drawings:

Figure 1 is a side elevation of an improved auto marine vehicle and trailer embodying the principles of this invention and showing the trailer rigidly secured in position to the rear end of the main body of the vehicle.

Figure 2 is a top plan view of the vehicle.

Figure 3 is a top plan view of the vehicle with the rear section being used as a trailer and attached to the main body of the vehicle.

Figure 4 is a rear elevation of the main body of the vehicle when used on land.

Figure 5 is an end elevation of the trailer.

Figure 6 is an enlarged fragmentary detail section taken on line VI—VI of Figure 2.

Figure 7 is an enlarged fragmentary detail section taken through one of the retaining bolts connecting the main body of the vehicle with the trailer body.

Figure 8 is an enlarged fragmentary detail section taken on line VIII—VIII of

Figure 3 illustrating a method of removably connecting the trailer to the main body of the vehicle.

Figure 9 is an enlarged transverse section of one of the pontoons taken on line IX—IX of Figure 1 with parts omitted.

Figure 10 is an enlarged fragmentary sectional view of the interior of one of the pontoons taken on line X—X of Figure 9.

Figure 11 is a side elevation of the rear portion of an auto marine vehicle and trailer illustrating the modified form of the device wherein the position of the supporting wheels for the trailer are changed from that illustrated in Figure 1.

As shown on the drawings:

The reference numeral 1 indicates the main body or hull of an auto marine vehicle, said body or hull being provided with a top section 2 of any desired construction. The sides of the main body 1 of the vehicle are shaped to afford upper pontoon recesses or pockets 3 and lower recesses or pontoon pockets 4, as clearly illustrated in Figure 4. The rear of the vehicle body 1 is shaped to afford a substantially flat wall 5. The vehicle when in the water is adapted to be propelled by a plurality of propellers 6 which are conveniently positioned to operate in a recess 7 provided in the lower rear portion of the main body 1. The propellers 6 are mounted on propeller shafts which receive their drive from the driving unit or motor positioned within the main body of the vehicle. Pivotally mounted on each side of the body 1 of the vehicle by means of a hinge section 8 is a sectional pontoon comprising a plurality of sections 9, 10, 11 and 12. All of the pontoon sections 9, 10, 11 and 12 are air tight and have the end walls thereof so constructed so as to complementarily fit with one another, as illustrated at 13 in Figure 10. The pontoon sections 9 and 11 are wheel carrying sections while the pontoon sections 10 are plain sections adapted to be inserted between the sections 9 and 11. The pontoon section 12 is an auxiliary section adapted to be used at the rear end of the main body of the vehicle. Each of the front pontoon sections 9 carries a front wheel 14 while each of the pontoon sections 11 carries a driving wheel 15. As clearly illustrated in Figure 9, each of the pontoon sections is provided with a longitudinally positioned reinforcing plate or bracket 16 having a sleeve section 17 adapted to receive a common retaining bolt 18 which extends through all of the sleeve sections 17 of the alined pontoon sections. Each of the pontoon sections is also provided on the interior of its opposite sides with a reinforcing plate or bracket 19 having an integral sleeve section 20 for the reception of a common securing bolt or shaft 21. Integrally formed on each of the reinforcing brackets 19 is an integral outwardly projecting stop rib or flange 22. The various pontoon sections 9, 10, 11 and 12 of the main portion of the vehicle are thus adapted to be rigidly secured together in alinement with one another by means of the removable retaining bolts 18 and 21 which extend longitudinally of the pontoons. The pontoon sections are thus rigidly secured together to form a complete pontoon unit. The driving wheels 15 of the vehicle being supported on the pontoon sections 11 may be connected in any desired way with the driving unit or motor of the vehicle.

Provided on the inner face of the rear wall 5 of the main body 1 is an internally threaded socket 22ª adapted to removably receive an eye bolt 23 which is interlocked with an eyebolt 24 removably threaded into a socket 25 fixed within the tapered end of a trailer body section 26, as clearly illustrated in Figure 8. The trailer body or housing 26 may be of any desired design and construction having a comparatively flat end wall 27, the margins of which are concave as at 28 to interfit with convex rim portions of the rear wall 5 of the main body 1. The two wall sections 5 and 27 are thus adapted to be positioned to closely interfit with one another, as clearly illustrated in Figure 6, when the trailer section is positioned as shown in Figures 1 and 2 to afford an elongated water craft. Secured around the marginal portion of the curved part of the trailer end plate 27 are a plurality of internally threaded sockets 29 adapted to have removably threaded therein retaining bolts 30 the heads of which are positioned within the interior of the main body section 1. The bolts 30 are provided with lock nuts 31 and project through sleeves 32 which are rigidly secured against the inner face of the curved portion of the wall 5, as illustrated in detail in Figure 7. The trailer body section at the bottom of the flat end thereof is provided with a recess 33 (Figure 6) so shaped to meet up with the propeller recess 7 of the main body 1. Both the housings 1 and 26 thus afford a suitable recess or pocket within which the propellers are adapted to operate.

The trailer housing 26 is shaped to afford upper pontoon recesses 34 and lower pontoon recesses 35, as illustrated in Figure 5. Pivotally supported on each side of the trailer housing 26 are air tight trailer pontoon sections 36 and 37 adapted to interfit with one another and seat within the lower pontoon recesses 35 of the trailer housing. The pontoon sections are pivotally supported in place by means of hinge mechanisms 38. Both of the trailer pontoon sections 36 and 37 are constructed similar to the pontoon 10 illustrated in Figure 9 and have the sleeve sections mounted on the interior thereof for the purpose of removably receiving the long retaining bolts or shafts 18 and 21 for the purpose of holding the pontoon sections of both the main body 1 and the trailer body 26 alined on opposite sides of the vehicle. Each of the trailer pontoon sections 37 carries a wheel 39 adapted to support the trailer when the vehicle is used on land.

Figure 11 illustrates a modified form of trailer similar in construction to the trailer 26 with the exception that the pontoon sections are replaced by pontoon sections 40 and 41. Each of the pontoon sections 40 is provided with a supporting wheel 42 while the end pontoon section 41 is without a wheel. It will thus be noted that the trailer may have either the front or rear pontoon sections provided with supporting wheels, as illustrated in Figures 1 and 11. It will also be understood that the wheel carrying sections of the pontoons for the main body 1 of the vehicle may be changed around to suit various designs of auto marine vehicles.

It will thus be seen that an auto marine vehicle and trailer is produced wherein the trailer may be rigidly secured by means of the bolts 30 to the rear end of the main body 1 of the vehicle to afford a water craft of increased length and greater stability having hingedly supported pontoons constructed of a plurality of air tight interfitting sections with the sectional pontoons on each side of the vehicle rigidly connected together by common bolts or retaining means so that the pontoon units may be swung upwardly when the vehicle is being used as a water craft into the upper pontoon pockets 3 and 34 of the body sections. When the pontoon units are swung upwardly the wheels carried thereby are also swung upwardly into an out-of-the-way position. The pontoons in their raised position may be secured in place by any desired means.

When it is desired to use the combined vehicle on land the pontoons may be swung downwardly into their lowered position thereby positioning the wheels 14, 15 and 39 to support the vehicle as it is run onto the land. When the vehicle is used on land the trailer 26 may be disconnected from the housing or body 1 and turned around to permit the tapered end of the trailer to be positioned adjacent the rear end of the housing 1. The connected eye bolts 23 and 24 may then be engaged in position to hold the trailer connected to the main body housing 1. Any selected connecting means may be used for connecting the housings 26 and 1 in place of the eye bolts 23 and 24.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A land and water craft comprising a main body portion, driving means therein, a trailer, interfitting pontoon sections on said main body portion and on said trailer, and wheels carried by certain of said pontoon sections for supporting the main body section and the trailer when used as a land vehicle.

2. In a land and water vehicle of the class described, the combination with a main body section, of a trailer section adapted to be rigidly secured thereto to increase the length of the vehicle when used as a water craft, pontoon units hingedly supported on said main body section and on said trailer section, said pontoon units comprising a plurality of interfitting sections, and wheels carried by certain of said sections for supporting the craft when used on land.

3. In a land and water vehicle of the class described, the combination with a main body, of a trailer body, means for rigidly securing said main body to said trailer body to form a water craft of increased length, and pontoon units on said main body and on said trailer body adapted to interfit with one another to form continuous sectional pontoons on each side of the vehicle.

4. A land and water vehicle of the class described comprising a main body section, a trailer section adapted to be rigidly secured thereto to form a water craft of increased length, and wheel carrying pontoon sections on said main body section and on said trailer section.

5. A land and water vehicle of the class described comprising a main body section, a trailer section, a plurality of interfitting pontoon sections on said main body section and on said trailer section, wheel carrying pontoon sections on said main body section and on said trailer section, and means for securing the pontoon sections and the wheel carrying sections on each side of the main body section and the trailer section rigidly together to form pontoon units on each side of the vehicle.

6. In a land and water vehicle of the class described, the combination with a main body section, of a trailer section, sectional pontoons on said main body section and on said trailer section for supporting the vehicle on land or in water, and means for rigidly securing the trailer section to the end of the main body section, said means being accessible from the interior of the main body section.

7. In a land and water vehicle, the combination with a body section, of a plurality of pontoon sections pivotally mounted on opposite sides thereof, said pontoon sections each being constructed of a plurality of interfitting pontoon sections.

8. In a land and water vehicle of the class described, the combination with a body section, of pontoon units movably mounted on each of the sides thereof with each of said pontoon units comprising a plurality of interfitting pontoon sections, and supporting wheels carried by some of said sections, for the purpose of supporting the vehicle when on land.

9. In a land and water vehicle of the class described, the combination with a main body section, of a trailer section, means for rigidly securing said trailer section to the main body section to form a body of increased length, driving means for the vehicle carried in the main body section, interfitting pontoon sections hingedly mounted on each side of the main body section and in the trailer section, and wheels carried by certain of said pontoon sections.

10. In a land and water vehicle, the combination with a main body section, of a trailer section, walls formed on said main body section, said trailer section and said main body section adapted to interfit with one another to afford a vehicle having a body of increased length, mechanisms for rigidly securing the interfitting walls of said main body section and said trailer section together, and sectional pontoons connected to said main body section and to said trailer section.

11. In a land and water vehicle of the class described, the combination with a main body section, of a trailer section adapted to interfit therewith, means for rigidly securing the trailer section to the main body section, sectional pontoons pivotally supported on the main body section and on the trailer section with the pontoons on said trailer section adapted to interfit with those on the main body section to afford continuous pontoons on each side of the vehicle, wheels supported on the sectional pontoons, driving means within the main body section, propellers adapted to be driven thereby to permit the vehicle to be propelled in the water, and means connecting the driving means with some of the pontoon wheels to permit the vehicle to be driven on land.

12. In a land and water vehicle of the class described, the combination with a plurality of body sections adapted to interfit with one another, means for rigidly securing the body sections together to afford a craft of increased length, sectional pontoons pivotally supported on said body sections, wheels carried by certain of said pontoon sections, and mechanisms for connecting the pontoon sections on each side of the body sections to afford pontoon units, said body sections being constructed with upper and lower pontoon pockets adapted to receive the pontoons when in their lowered or raised positions.

13. In a land and water vehicle of the class described, the combination with a main body section, of a trailer section adapted to be rigidly secured thereto to afford a vehicle of increased length, and a plurality of wheel carrying pontoons pivotally supported on said main body section and on said trailer section.

14. In a land and water vehicle of the class described, a main body section, driving elements carried therein, a trailer section, means for rigidly securing the trailer section to the main body section to provide a craft of increased length, a plurality of plain pontoon sections movably supported on said main body section and on said trailer section, a plurality of wheel carrying pontoon sections movably mounted on said main body section and on said trailer section, means for rigidly securing the plain pontoons to the wheel carrying pontoon sections on each side of the craft together to form pontoon units, and driving means connected with the wheels of certain of said pontoon sections to permit the vehicle to be driven on land.

15. The combination with a land and water vehicle, of a trailer adapted to be connected with the vehicle when used on the land and further adapted to be rigidly connected to the vehicle when used as a water craft to increase the overall length of the same.

16. The combination with a land and water vehicle, of a trailer adapted to be drawn after the vehicle when the same is used on the land, and means for rigidly securing the trailer to the vehicle to increase the length thereof when the vehicle is used as a water craft.

17. The combination with a land and water vehicle, of a trailer, means for removably connecting one end of the trailer to the vehicle when the vehicle is used on the land, and means for rigidly securing the other end of the trailer to the vehicle when the vehicle is used as a water craft.

18. In a land and water vehicle of the class described, the combination with a pontoon carrying main body section, of a pontoon carrying trailer section adapted to be used as a trailer when on the land and as an extension for the main body section when the same is used as a water craft.

In testimony whereof I have hereunto subscribed my name.

ALBERT E. COOK.